United States Patent
Pream et al.

(10) Patent No.: US 10,802,756 B1
(45) Date of Patent: Oct. 13, 2020

(54) FLASH QUEUE STATUS POLLING

(71) Applicant: Seagate Technology LLC, Cupertino, CA (US)

(72) Inventors: Jeffrey John Pream, Berthoud, CO (US); Jeremy Blair Goolsby, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/033,607

(22) Filed: Jul. 12, 2018

(51) Int. Cl.
G06F 3/00 (2006.01)
G06F 3/06 (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,323,489 A | 6/1994 | Bird | |
| 6,643,767 B1* | 11/2003 | Sato | G06F 9/3836 712/218 |
| 8,850,103 B2 | 9/2014 | Bennett | |
| 9,734,050 B2 | 8/2017 | Sinclair et al. | |
| 2008/0028131 A1* | 1/2008 | Kudo | G11C 16/10 711/103 |
| 2009/0006905 A1* | 1/2009 | Luick | G06F 9/30101 714/52 |
| 2013/0019050 A1 | 1/2013 | Somanache et al. | |
| 2013/0318285 A1 | 11/2013 | Pignatelli | |
| 2014/0089734 A1* | 3/2014 | Busaba | G06F 11/0715 714/16 |
| 2016/0202914 A1* | 7/2016 | Hsu | G06F 3/0604 714/49 |

OTHER PUBLICATIONS

Onufryk, "How the Streamlined Architecture of NVM Express Enables High Performance PCIe SSDs", IDT, Flash Memory Summit, CA, 2012, 16 Pages.

(Continued)

*Primary Examiner* — Reginald G Bragdon
*Assistant Examiner* — Michael L Westbrook
(74) *Attorney, Agent, or Firm* — Setter Roche LLP; Christian W Best; Kirk A Cesari

(57) ABSTRACT

Systems and methods are disclosed for command status polling at a flash queue of a non-volatile memory device. The flash queue may be configured to perform polling on the status of flash operations without direct oversight from the data storage controller or firmware. In certain embodiments, a flash queue circuit may be configured to receive, from a data storage controller of a nonvolatile solid state memory (NVSSM) data storage device, one or more commands to access a flash memory of the NVSSM data storage device, each command of the one or more commands including one or more instructions. The flash queue circuit may execute the one or more commands to access the flash memory, evaluate a status response from the flash memory at the flash queue circuit, and re-execute a sequence of instructions of the one or more commands based on the status response.

19 Claims, 6 Drawing Sheets

(56) References Cited

OTHER PUBLICATIONS

Marks, "An NVM Express Tutorial" Dell, Inc., Flash Memory Summit, CA, 2013, 92 pages.
Rowen, "Flexible Architectures for Scalable Flash Controllers", CTO-IP Group, Aug. 2014, 19 pages.
STmicroelectronics, "STR91xFA Flash programming manual", Apr. 2008, 87 pages.

\* cited by examiner

FLASH QUEUE STATUS POLLING

SUMMARY

In certain embodiments, an apparatus may comprise a flash queue circuit configured to receive, from a data storage controller of a nonvolatile solid state memory (NVSSM) data storage device, one or more commands to access a flash memory of the NVSSM data storage device, each command of the one or more commands including one or more instructions. The flash queue circuit may execute the one or more commands to access the flash memory, evaluate a status response from the flash memory at the flash queue circuit, and re-execute a sequence of instructions of the one or more commands based on the status response.

In certain embodiments, a method may comprise receiving, at a flash queue circuit from a data storage controller of a nonvolatile solid state memory (NVSSM) data storage device, one or more commands to access a flash memory of the NVSSM data storage device, each command of the one or more commands including one or more instructions. The method may include executing the one or more commands at the flash queue circuit to access the flash memory, evaluating a status response from the flash memory at the flash queue circuit, and re-executing a sequence of instructions of the one or more commands based on the status response at the flash queue circuit without instruction from the data storage controller.

In certain embodiments, an apparatus may comprise a nonvolatile solid state memory (NVSSM) data storage device, including a data storage controller configured to receive commands from a host external from the NVSSM data storage device, a flash memory, and a flash queue circuit. The flash queue circuit may be configured to receive, from the data storage controller, one or more commands to access the flash memory, each command of the one or more commands including one or more instructions. The flash queue circuit may execute the one or more commands to access the flash memory, evaluate a status response from the flash memory at the flash queue circuit, and re-execute a sequence of instructions of the one or more commands when the status response did not return a successful result.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
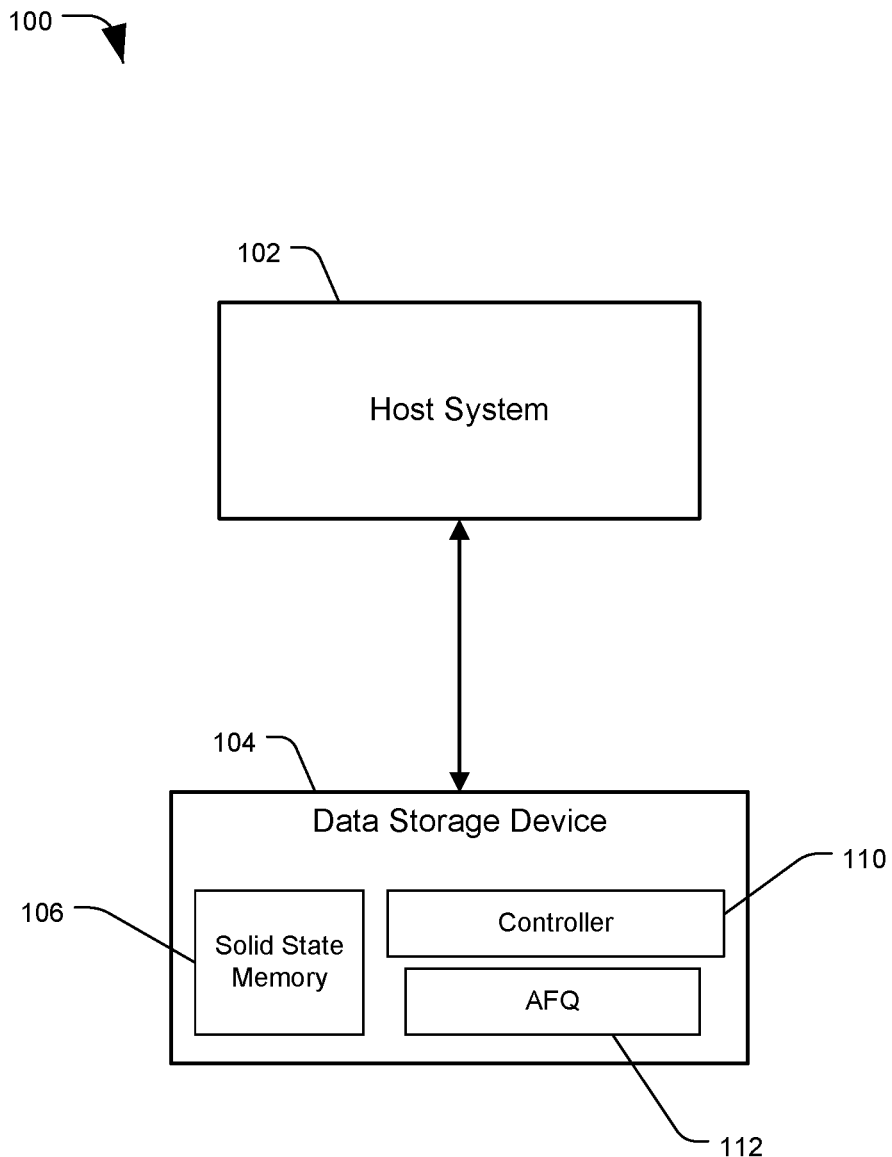
FIG. 1 is a diagram of a system configured to perform flash queue status polling, in accordance with certain embodiments of the present disclosure.

FIG. 1 is a diagram of a system, generally designated 100, configured to perform flash queue status polling, in accordance with certain embodiments of the present disclosure. The system 100 may include a data storage device (DSD) 104, such as a storage drive or any other device which may be used to store or retrieve data, including a solid state drive (SSD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives. The DSD 104 may include a memory 106 and a controller 110. The memory 106 may comprise one or more non-volatile memory (NVM) data storage mediums, such as non-volatile solid state memory (sometimes referred to herein as NVSSM or SSM) including NAND flash memory, other types of memory, or a combination thereof. The controller 110 may be one or more processors or circuits configured to perform data access operations, such as reads or writes (also called program operations), to the memory 106. The controller 110 may be referred to as a data storage controller, or as the main central processing unit (CPU) or processor of the DSD 104. The controller 110 may execute firmware (FW) that controls operations of the DSD 104. Data retrieved from the memory 106, or to be stored to the memory 106, may be processed via the controller 110, a read/write (R/W) channel, or other elements for encoding or decoding data, error correction, or other processing.

Commands sent from the controller 110 to be executed on the solid state memory 106 may be queued, and in some instances executed, by a command queue circuit for the memory 106, such as an advanced flash queue (AFQ) 112. Data access commands may be sent from the controller 110 to the AFQ 112, where they are placed in an instruction queue pending execution. The AFQ 112 may then retrieve commands from the instruction queue and execute them by retrieving or storing the requested data to the solid state memory 106. In an example, the solid state memory 106 may include a plurality of flash die chips or logical unit numbers (LUNs), and the controller 110 may issue multiple commands for execution on different LUNs, which the AFQ 112 may place into the instruction queue. The AFQ 112 may be a hardware (HW)-based circuit, including registers, volatile or nonvolatile memory, or other components configured to execute command queueing and status polling as described herein. In some embodiments, the AFQ 112 may include one or more firmware (FW)-driven microprocessors for executing the operations described herein.

The system 100 may include a host device 102, which may also be referred to as the host system, host computer, or simply 'host'. The host 102 can be any computer or system that sends commands to the DSD 104. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the memory 106 via the controller 110 based on the requests. The DSD 104 may also access the memory 106 independently of host 102 commands, such as for storage or retrieval of system data and other metadata used by the DSD 104.

When data access operations such as reads and writes are executed on a memory 106, it can take some period of time for the memory 106 to complete the data storage or retrieval. A data access operation may need to complete before certain further operations can be performed at the DSD 104, and so the DSD 104 may need to determine when the memory 106 has successfully completed the operation.

In some implementations, the controller 110 may first send commands to the AFQ 112 for execution, and then the controller 110 may repeatedly perform interrupts or polling to the AFQ 112 to determine the status of commands. When the controller 110 determines that a command has completed, it may send a next command that may have been dependent on the status of the completed command. However, this can require significant intervention from the controller 110 to oversee the completion status of commands. Performing the status polling can tie up resources of the controller 110 that may be better spent performing other operations for the DSD 104. Further, relying on the controller 110 to perform status polling can introduce data throughput inefficiencies, as the system waits on the controller 110 to trigger various steps involved for read and write operations. Waiting for the FW to respond to interrupts due to events on the memory 106 in this manner may be an operational chokepoint.

In other implementations proposed herein, the AFQ 112 may be configured to monitor for command statuses instead of the controller 110, thereby freeing the controller 110 to perform other work. When the flash or other memory 106 returns a 'ready' status or indicates that a command has completed, the AFQ 112 may immediately begin sending the next command or data. This may allow the controller 110 to send commands for queueing at the AFQ 112 that depend on the completion of other commands, without the controller 110 needing to know completion status of the other commands first. The AFQ 112 can automatically initiate pending commands that rely on other commands when the memory 106 is no longer busy with the other commands. Accordingly, the controller 110 is not only freed of polling for command statuses, but data throughput can also be improved by the described AFQ 112.

Another performance enhancement may be that the AFQ 112 configured to perform status polling can allow the FW to buffer instructions in multiple command threads, sometimes referred to as simply 'threads,' at the AFQ 112. Command threads may be an independently managed command processing instance that executes concurrently with other command threads, and each thread may process a sequence of instructions or commands. The controller 110 or other component of the DSD 104 may assign each command or instruction a thread number or identifier. Commands in each thread may generally be executed in-order within the thread (e.g. based on an order they were received in at the AFQ 112 from the controller 110). But among the different threads the AFQ 112 may usually arbitrate round-robin between them (e.g. each thread being given a turn in equal proportion in a circular order), unless inter-thread blocking or prioritization methods are used. The advantage of buffering instructions in multiple thread is that reads for data that spans multiple LUNs (or die, or other data storage units) can each be put on a different thread, and when a given LUN's flash status is 'ready' the AFQ 112 can automatically allow that thread to proceed. Several threads can take turns polling to see if their LUN is ready, without any FW intervention. An example embodiment of system 100, including a more detailed diagram of DSD 104, is depicted in FIG. 2.

Figure 2:
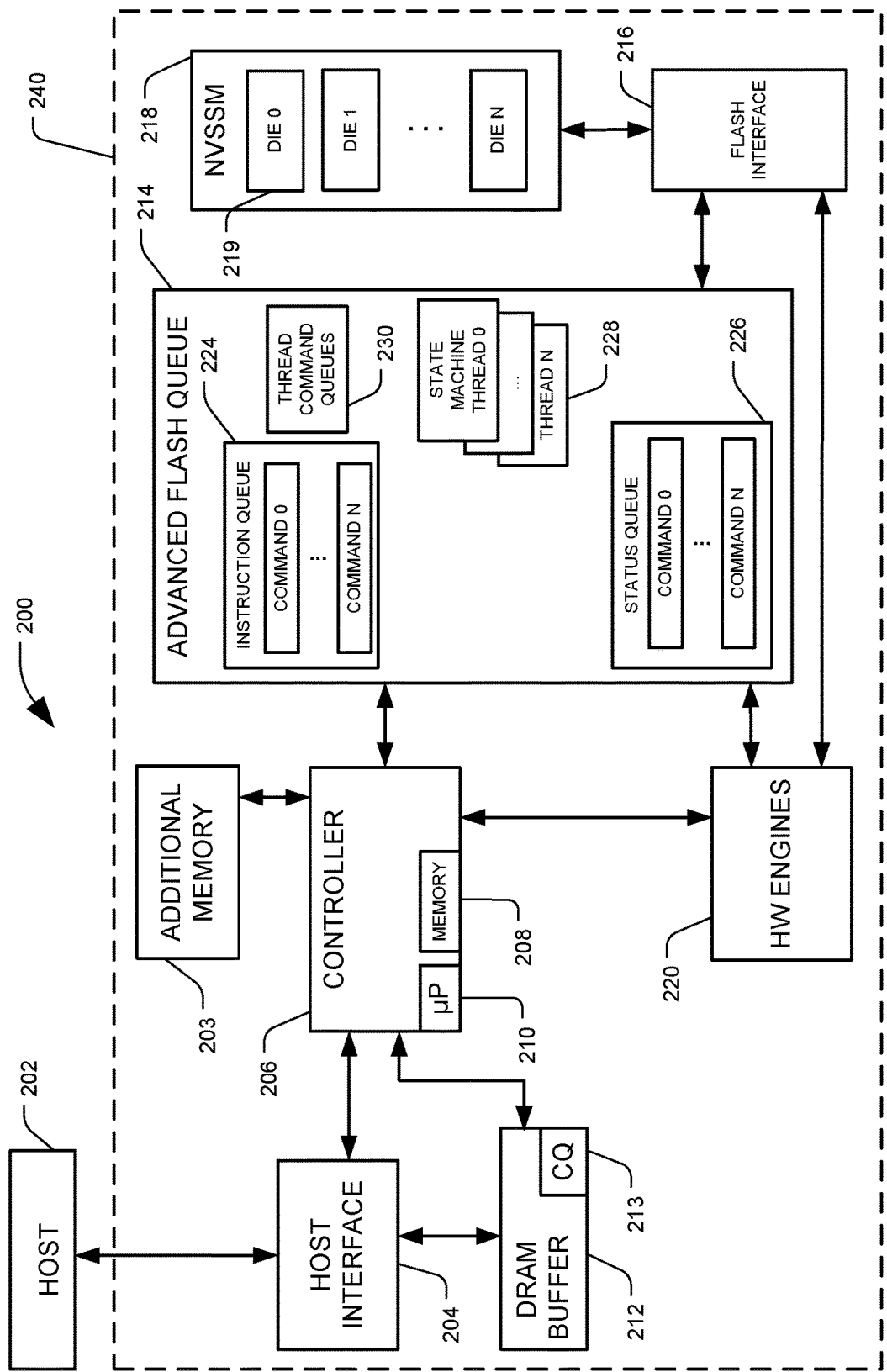
FIG. 2 is a diagram of a system configured to perform flash queue status polling, in accordance with certain embodiments of the present disclosure.

FIG. 2 is a diagram of a system, generally designated 200, configured to perform flash queue status polling, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as solid state drive (SSD) or NVSSM data storage device 200, according to some embodiments. The one or more of the components of the DSD 104 may be included on a single integrated circuit (e.g. a system on a chip, SoC), may be distributed among several circuit or hardware components, may be implemented as firmware modules executed by microprocessors, or in other configurations.

The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector that allows the DSD 200 to be physically removed from the host 202. The DSD 200 may have a casing 240 housing the components of the DSD 200.

Commands received from the host 202 via the interface 204 may be stored into a buffer 212. The buffer 212 can be DRAM, SRAM, or other types of memory. The buffer 212 can temporarily store data during read and write operations, and can include a command queue (CQ) 213 where multiple pending host commands can be temporarily stored pending execution. Commands arriving over the interface 204 may automatically be received in the CQ 213 or may be stored there by controller 206, interface 204, or another component.

The DSD 200 can include one or more nonvolatile solid state memories (NVSSM) 218, such as NAND flash memory (and sometimes referred to herein simply as 'the flash' or 'the flash memory'). A NAND flash memory device may include a plurality of physical dies 219 (e.g. N+1 dies, from die 0 to die N) for storing data. In some embodiments, each die 219 may only be capable of performing one data access operation at a time (e.g. one read, or one write).

To improve efficiency, data may therefore be stored to the NVSSM 218 using a data striping approach. Rather than performing multiple consecutive related writes to a single die 219 to fill the NVSSM 218 one die at a time, data may be written to a data stripe that is striped across multiple dies 219. An example data stripe may include one page from a corresponding selected block from each die 219. In this manner, related data may be stored, or read from, multiple different dies 219 in concurrent data access operations.

The DSD 200 may include one or more additional memories 203 instead of or in addition to NVSSM 218. For example, additional memory 203 can be either volatile memory such as DRAM or SRAM, disc-based nonvolatile memories such as magnetic hard discs, other types of memory, or a combination thereof. The additional memory 203 can function as a working memory for storing generated parity data or other temporary information, a cache to store recently or frequently read or written data, or data likely to be read soon, or for other temporary data storage. Additional memory 203 may also function as main long-term storage instead of or in addition to NVSSM 218. A DSD 200 containing multiple types of nonvolatile storage mediums, such as a disc(s) and flash, may be referred to as a hybrid storage device.

The DSD 200 can include a programmable controller 206, which can include associated memory 208 and processor 210. The controller 206 may manage operations of the DSD 200. In particular, the controller 206 may control data access operations, such as reads, writes, and erases to one or more nonvolatile solid state memories (NVSSM) 218, such as NAND flash memory. The controller 206 may retrieve host commands from the CQ 213, and may determine how to process the commands. Host commands that include accessing the NVSSM 218 may be converted into a different command format, may have additional metadata appended, or may otherwise be modified by the controller 206 before it sends them to an advanced flash queue (AFQ) 214 for execution on the NVSSM 218. For example, the controller 206 may know a number of command threads the DSD 200 is configured to execute, and may assign each command to a selected command thread by setting the value of a field of the command structure before sending the command to the AFQ 214. The controller 206 may also exchange information with the AFQ 214 besides host commands, such as status inquiries for pending commands or information on the number of commands currently queued for execution.

The AFQ 214 may correspond to the AFQ 112 of FIG. 1, and may be configured to perform functions and operations including command arbitration, delivery, status monitoring, and storage to the NVSSM 218, among other functions. The AFQ 214 may receive commands and instructions from the controller 206, and may manage the timing of execution and delivery of the commands to the NVSSM 218. In particular, the controller 206 may send sequences of instructions to the AFQ 214, which may include both instructions for operations to execute at the AFQ 214, as well as commands to pass to the NVSSM 218 via a flash interface circuit or module 216. The AFQ 214 can execute sequences of instructions that may include initiating or sending commands to the flash interface 216. The AFQ 214 may pass relatively high-level commands (e.g. 'send ADDRESS' or 'send CMD==read') to the flash interface 216. The flash interface 216 can translate those commands to a low-level standard flash signaling protocol to provide to the NVSSM 218 for execution. The AFQ 214 may send commands or instructions to the NVSSM 218 via a flash interface circuit 216. Data (e.g. commands, instructions, addresses, or bulk or user data) may be transmitted between the flash interface 216 and the NVSSM 218 via a bus (e.g. the wiring between the flash interface 216 and the NVSSM 218). The flash interface 216 may relay status information about the NVSSM 218 to the AFQ 214, such as busy status indicators.

The AFQ 214 may include an instruction queue 224 and a status queue 226. The instruction queue 224 may include a memory for storing commands received from the controller 206 and pending execution by the AFQ 214. The status queue 226 may include a memory for storing statuses of executed commands, such as status values returned from the NVSSM 218.

The AFQ 214 may also include one or more state machines configured to control an operational flow of one or more command threads. In some embodiments, there may be a separate state machine for each thread (e.g. if the DSD 200 is configured for three command threads, there may be three state machines, one for each command thread). In other embodiments, a state machine may be configured to manage a plurality of command threads, and can switch its executing thread between all the threads the state machine is managing. Each thread state machine may include circuitry, program instructions, memories, or any combination thereof, designed to coordinate and manage the execution and status of commands from the corresponding command thread. The AFQ 214 may also include thread command queues 230, for example one thread command queue for each command thread or for each state machine 228. When a command is received from the controller 206, it may be stored to the instruction queue 224. In addition, the AFQ 214 may determine which thread the command has been assigned to, and generate a pointer to the command's position in the instruction queue 224, and then store the pointer in the thread command queue 230 for the determined thread. In this manner, all commands may be stored in the instruction queue 224, and each thread may have a thread queue 230 of pointers to only commands in the instruction queue for that particular thread. The thread state machines 228 can use the thread command queues 230 to manage the commands for their threads.

The DSD 200 may also include one or more hardware (HW) engines 220. The HW engines 220 may be logic blocks or circuits configured to facilitate bulk data transfer (e.g. of user data payloads rather than instructions or data storage addresses) for reads and write or program operations to the NVSSM 218. In some embodiments larger data transfers may be performed via the AFQ 214; however it may be more efficient to perform these operations via the HW engines 220 connected to the NVSSM 218 directly via the flash interface 216. In an example embodiment, the controller 206 may send a flash read or write command or instruction set to the AFQ 214. The read or write command may include a command identifier (e.g. 'read operation' or 'write operation') and an address to access in the NVSSM 228. For write commands, the controller 206 may provide the user data to the HW engines 220, or the HW engines may be configured to obtain the data payloads from the DRAM buffer 212 or another backend location. The AFQ 214 may place the command in the instruction queue 224, and then send it to the NVSSM 218. When the NVSSM 218 returns a ready status indicating that the read data has been read, the AFQ 224 may send an instruction to the HW engines 220 to retrieve the read data from the NVSSM 218. Alternately, for a write operation, the AFQ 214 may send the instruction type and address information to the NVSSM 218 and then instruct the HW engines 220 to send along the data payload when the NVSSM 218 is ready. Read data may be provided to the controller 206 or returned to the host 202 via the DRAM buffer 212 or another mechanism.

As described in regard to FIG. 1, the controller 206 may be configured to send commands and then perform status polling on those commands to determine when to send additional commands. However, having the controller 206 oversee command statues may be inefficient in both occupying controller 206 resources and in data throughput delays. Instead, the AFQ 214 may be configured to perform the status polling, and may automatically initiate follow-up operations without requiring additional input from the controller 206.

In an example proposed embodiment, the AFQ 214 can have an instruction queue 224 and a status queue 226 to provide a mechanism to the controller 206 that allows multiple operations to be sequenced across the flash bus without the need for the controller 206 to actively observe the flash 218 busy states.

The AFQ 214 can buffer commands or instructions, such as 32-bit advanced high-performance bus (AHB) writes, received from the controller 206 to the instruction queue 224. Each instruction queue 224 entry may correspond to a flash bus operation to be sent to the NVSSM 218, an HW engine 220 program or trigger, or a local control operation affecting command execution at the AFQ 214. Flash bus operations may be given to the flash interface module 216 to be driven onto the flash bus to the NVSSM 218. HW engine operations can be passed to the HW engines 220 specified in the operation. As stated herein, HW engines 220 can either move write data to the NVSSM 218 from a backend client, or read data to a backend client from the NVSSM 218 once fetched.

Status information can be captured to the status queue 226 from the NVSSM 218, regarding status of the NVSSM 218 itself or operations sent to the NVSSM for execution. The methods for retrieving status from the NVSSM 218 may be dependent on the NVSSM's type and interface protocols. The instructions to execute a status retrieval sequence can be written into the AFQ 214. In some embodiments, the status queue 226 may be a first-in, first-out (FIFO) queue structure, and data captured to the status queue 226 may be read out by the controller 206. The status of an operation indicated in the status queue 226 can be used to control instruction flow at the AFQ 214. The status values or indicators stored to the status queue 226 can be compared against known "good", "bad", or "neither good nor bad" values. Values or "bitmasks" may be stored to one or more registers of the AFQ 214 that indicate "good" statuses, "bad" statuses, or other statuses for flash operations. A good status may indicate the command executed successfully, while a bad or other status may indicate that the command has not yet completed or has failed (e.g., the requested data was not able to be retrieved). When a status is captured from the NVSSM 218, it may be compared (e.g. via a logical AND operation) to the "good" or "bad" status values stored to the registers. If a received status matches a good status value, the operation may continue (e.g. a HW engine data fetch may be triggered to proceed). If the status matches a "bad" value in register space, the operation may halt, and an interrupt may be triggered (e.g. an interrupt to the controller 206 indicating that an operation failed). Optionally, if the status matches a bad result, or neither a good nor bad result, the AFQ 214 may continually re-perform a status check for the operation, or reissue the operation itself, until a good result is returned or a timeout is reached. A timeout being reached may also trigger an interrupt, as may other events, such as the AFQ 214 executing a "STOP" instruction from the controller 206. The AFQ 214 may re-issue commands or re-perform status checks using a rewind feature that will be discussed in greater detail below.

An example read that involves multiple LUNs (e.g. part of the data requested by a host may be stored to LUN0, and part of the data may be stored to LUN1) is presented below, first according to a system where the controller 206 is performing the status polling, and then second according to a system using the AFQ 214 to perform status polling.

The read may proceed according to the following abridged process steps in a system with the controller 206 performing the status polling. From the perspective of the FW or controller 206, the read may involve:

1) Send read start command and address for LUN0 to the AFQ 214;
2) Send read start command and address for LUN1 to the AFQ 214;
3) Send Flash Status command and address for LUN0 to AFQ 214;
4) Check returned status; if 'not ready' return to step #3 above;
5) Send instruction for HW engine 220 to fetch the Read data from the NVSSM 218;
6) Poll the busy status of the HW engine 220 to see when the data fetch completes;
7) Send Flash Status command and address for LUN1 to AFQ 214
8) Check returned status; if 'not ready' return to step #7 above;
9) Send instruction for HW engine 220 to fetch the Read data from the NVSSM 218; and
10) Poll the busy status of the HW engine 220 to see when the data fetch completes.

The status checking and polling operations may take significant time. For example, the status check of steps 4 and 8 may require more than 100 microseconds, during which time the controller 206 may be occupied performing the status check. Further, the controller 206 may delay sending the data fetch instructions at steps 5 and 9 until the read status from the NVSSM 218 indicates it is ready after the read. The controller 206 may similarly be occupied polling for the status of the read fetch operations from the HW engines 220 at steps 6 and 10.

However, using an AFQ 214 programmed to perform status polling, the above steps can be simplified, from the FW perspective, as follows:

1) Send read start command and address for LUN0 to the AFQ 214;
2) Send read start command and address for LUN1 to the AFQ 214;
3) Send Flash Status command and address for LUN0 to AFQ 214;
4) Send instruction for HW engine 220 to fetch the Read data from the NVSSM 218;
5) Send Flash Status command and address for LUN1 to AFQ 214; and
6) Send instruction for HW engine 220 to fetch the Read data from the NVSSM 218.

Here, the controller 206 does not need to perform the flash status polling, thereby eliminating steps 4 and 8 of the previous process, allowing the controller 206 to work on other operations. Additionally, the controller 206 may not need to delay sending the data fetch instructions for the HW engines 220, and may send those instructions immediately after the data read and status commands. For example, the HW engine data fetch instructions can be sent from the controller 206 to the AFQ 214 together with the read start and flash status commands, regardless of the status of the flash and before the data fetch can be executed. The sequence of commands can all be stored to the instruction queue 224. The AFQ 214 may then initiate the data fetch via the HW engines 220, by sending the HW engine data fetch instructions to the HW engines 220 once the AFQ 214 determines the flash is ready. Similarly, the FW-based HW engine 220 status polling of steps 6 and 10 of the previous process can be avoided. The AFQ 214 can block execution of the next instruction if it requires a resource (HW engine 220 or other) that is currently unavailable. For example, in the case of a read operation, the HW Engine 220 may be busy until it fetches all requested data from NVSSM 218 via the flash interface 216. The HW can monitor the resource. Once the resource becomes available, the AFQ 214 can continue execution. This removes the need for FW intervention in the sequence execution.

In effect, the controller 206 is now free to send sequences of commands without overseeing the progress of those commands. This may result in commands being sent to the NVSSM 218 faster than they can be executed, potentially resulting in overflowing the instruction queue 224 at the AFQ 214. To avoid this, the controller 206 may be able to query the AFQ 214 for a queue depth (e.g. number of still pending commands) for the instruction queue 224, for example prior to sending commands. The controller 206 may determine whether to delay sending additional commands based on how busy the NVSSM 218 or AFQ 214 are. A more detailed depiction of the AFQ 214 and connected components is depicted in regard to FIG. 3.

Figure 3:
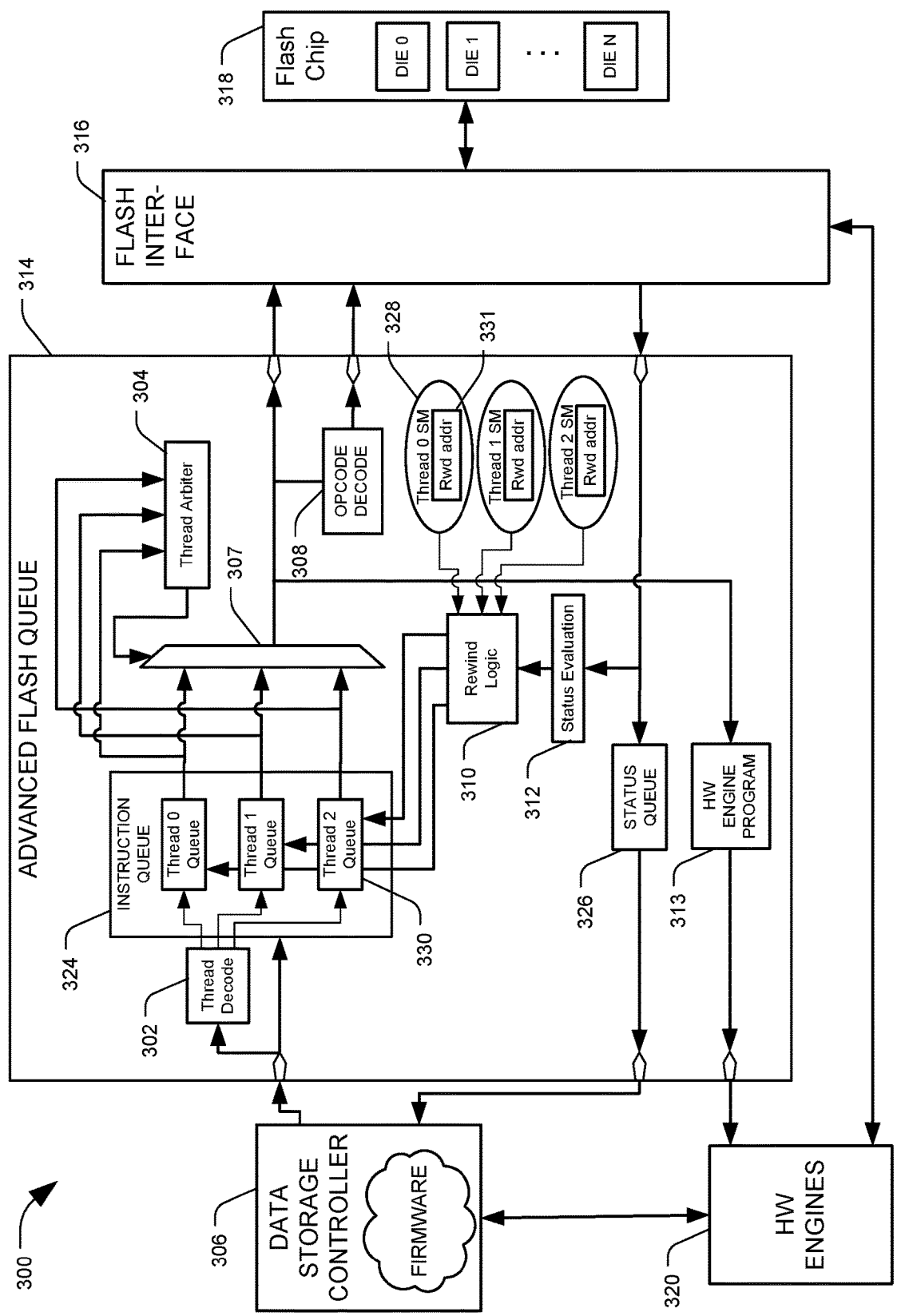
FIG. 3 is a diagram of a system configured to perform flash queue status polling, in accordance with certain embodiments of the present disclosure.

FIG. 3 is a diagram of a system, generally designated 300, configured to perform flash queue status polling, in accordance with certain embodiments of the present disclosure. Specifically, FIG. 3 provides a functional block diagram of an example advanced flash queue of a data storage device (DSD) 300, which may be an example of the DSD 104 of FIG. 1.

The DSD 300 may include a data storage controller 306, configured to execute firmware (FW) for the DSD 300 and send commands to the advanced flash queue (AFQ) 314. The DSD 300 may also include hardware (HW) engines 320, flash interface 316, and flash chip 318, which may operate as described previously herein.

The FW 306 may pass commands and instructions to the AFQ 214, which may be stored into an instruction queue 324. Each instruction sent from the FW 306 to the AFQ 314 may be in a structured format (e.g. 32-bit instruction) with a plurality of fields. Some fields may be a single bit (e.g. a "flag"), while some may be multiple bits in length. Some commands include multiple instructions to provide the information for execution. An example flash instruction may include fields identifying: a number of parameters (e.g. a number of entries following the current instruction to define operational parameters); an opcode (e.g. an operation code identifying what operation to perform); a thread number; sequence tag information (e.g. identifying sequences of related commands that may be placed into different threads, and which can be used to control the order of command execution between threads); blocking information (e.g. used to control interactions among threads, such as by blocking commands in one thread until a thread with a particular sequence tag executes on another thread); and 'atomic' or continuous fields (e.g. used to control interactions among threads, such as to make sure no intervening commands from another thread are executed before the next command of the current thread).

In multi-thread architectures, commands for all threads may be stored to the instruction queue 324 together. For some instruction queues 324, such as FIFO instruction queues, commands for any given thread may not be stored contiguously, and therefore commands for all threads may be interspersed with other thread entries. Any entries to the instruction queue 324 can be tagged (e.g. by the FW 306) as belonging to a selected thread. In the example embodiment depicted, there may be three threads, thread 0, thread 1, and thread 2. In addition to storing incoming commands to the instruction queue 324, a thread decode module 302 may also check the incoming commands for their respective thread identifiers. Each thread may have its own thread command queue 330 (e.g. a FIFO), which may store pointers to entries in the main instruction queue 324 for commands for that particular thread. The thread decode module 302 may store the pointers to the thread command queues 330 based on the thread identifier for each command. Although the thread queues 330 are depicted as being within the instruction queue 324 for simplicity of description and presentation, they may be separate from the instruction queue with a list of pointers to entries in the instruction queue 324. The thread command queues 330 may be used, e.g. by thread state machines 328, to manage the operation of individual threads.

A thread arbiter module 304 may be used to select which thread the next instruction will come from for execution. The thread arbiter 304 can enforce the thread atomic and blocking policies specified in the instruction flags, and interact with the thread state machines 328 to determine whether a thread may proceed or not. Under normal operation, commands from each thread may be selected in turn using round-robin scheduling, without any priority to any thread. However, the thread arbiter 304 may determine if changes are to be made to command scheduling based on the fields of each command. For example, if a command from thread 0 indicates (e.g. via a blocking field) that it should not be executed until a command in another thread with a particular sequence tag has executed, then commands from thread 0 may be halted pending execution of the command or commands with the identified sequence tag. If a command from thread 1 includes an "atomic" bit, it may indicate that the next command should also come from thread 1.

Control signals may be sent from the thread arbiter 304 to a multiplexer 307 to control which thread will have its command selected next for execution. The multiplexer 307 may let a command from the identified thread pass through. Flash operations may be sent to the flash interface 316, while HW engine operations may be sent to the HW engines 320.

Flash operations may be provided to the flash interface module 316 and driven onto the flash bus to the flash chip 318. The selected flash command may also be analyzed at an opcode decoding module 308, which may extract instructional information from the command to provide to the flash interface 316. The instructions provided to the AFQ 214 from the controller 306 may be higher level than the flash bus protocol commands executed by the flash chip 318. It is the flash interface's 316 logic that drives the flash bus protocol. The opcode decode module 308 can analyze the instructions from the controller 306 and determine what parameters, if any, are passed to the flash interface 316 logic.

HW engine operations may be sent to the HW engines 320 via the HW engine program module 313. Similar to the opcode decoding module 308, the HW engine program module 313 may analyze the high-level AFQ 314 instructions and convert them into the appropriate command protocol format, such as converting the commands into low-level instructions that can be executed by the HW engines 320.

Status results for commands can be returned from the flash interface 316 and stored to the status queue 326, such as in a FIFO. Status information may be provided to the FW 306 from the status queue 326, for example using an interrupt or in response to a FW 306 status request. In some embodiments, command statuses can be returned to the FW 306 for each command, or each command sent to the flash. In other embodiments, the FW 306 may only be notified of statuses for commands that failed or returned a bad status result, thereby minimizing FW interactions and reducing the workload on the controller 306. In some embodiments, an interrupt to the FW 306 may be generated when the status queue 326 is nearly full, allowing the FW 306 to check many statuses at once and empty out the status queue 326.

Status results may also be analyzed by a status evaluation module 312. The status evaluation module may determine, e.g. based on comparing one or more stored bit masks or sequences against the returned status value, whether the returned status indicates a "good" status, a "bad" status, or a status that does not match good or bad values. Good values may indicate the operation may proceed, either by notifying the FW 306 the operation completed or triggering a next command, such as a HW engine 320 data fetch. A bad or not-good result may trigger an interrupt, or may trigger the rewind logic module 310 to re-issue the command.

The rewind logic 310 may be configured to adjust a read pointer for a given thread in order to re-issue selected commands. For example, each thread state machine 328 may be configured to store one or more rewind pointer addresses 331. The rewind pointer 331 may point to an address in a thread command queue 330, which in turn points to a command entry in the instruction queue 324. When certain commands (e.g. a read start, or a status polling loop start, sometimes called a "STATPOLL" instruction) are received and stored to the instruction queue 324 and a thread queue 330, a rewind address pointer 331 may be stored. The thread state machine 328 may advance through its command queue 330 using a read pointer. If a bad status is returned for a command in a selected thread, the rewind pointer 331 may be loaded into the read pointer register, thereby "rewinding" the thread back to the instruction for which the rewind pointer 331 was set. The command designated by the rewind pointer 331 may then be selected again as the next command to issue for the selected thread. In this manner, a command can continually be reissued until a "good" status is received or until the command times out. If a "good" status is received for a command, the stored rewind pointer address 331 may be cleared, or replaced with a pointer to the next command for that thread.

Accordingly, when the rewind logic 310 is triggered by a bad status result, the rewind pointer address 331 for the corresponding thread may be retrieved, and the read pointer for the thread queue 330 may be set equal to the rewind pointer 331. The AFQ 314 command flow may loop as described above may then loop until a good status is returned or the command times out.

As described above, each command (e.g. a read command) may comprise a sequence of individual instructions. An example instruction sequence for a read command of the example system is provided below:

| Instruction: | Effect: |
| --- | --- |
| STATPOLL | (does nothing on flash bus; this is a marker for where to set the rewind pointer) |
| CHIP_EN | (sent to flash 318; enables the flash chip 318 to perform data access) |
| CMD w/data=78h | (sent to flash 318; identifies the command 78 h "read" operation) |
| ADDR | (sent to flash 318; identifies the address bytes to be read) |
| READ | (sent to HW engines 320; retrieves data from flash 318) |

An example execution loop on the flash bus for the above instruction sequence may be as follows:

| To flash: | Returned status: |
| --- | --- |
| → CHIP_EN, 78h, ADDR | ←<bad_status> |
| → CHIP_EN, 78h, ADDR | ←<bad_status> |
| ..., | |
| → CHIP_EN, 78h, ADDR | ←<good_status> |

After receiving the "good_status" result, the AFQ 214 may send the READ instruction to the HW engines 320 to retrieve the requested data. The AFQ 314 has therefore saved the data storage controller 306 and firmware from having to monitor command status and reissue commands by handling those processes without additional input from the FW 306. The rewind pointer and thread command queues will be discussed in greater detail in regard to FIG. 4.

Figure 4:
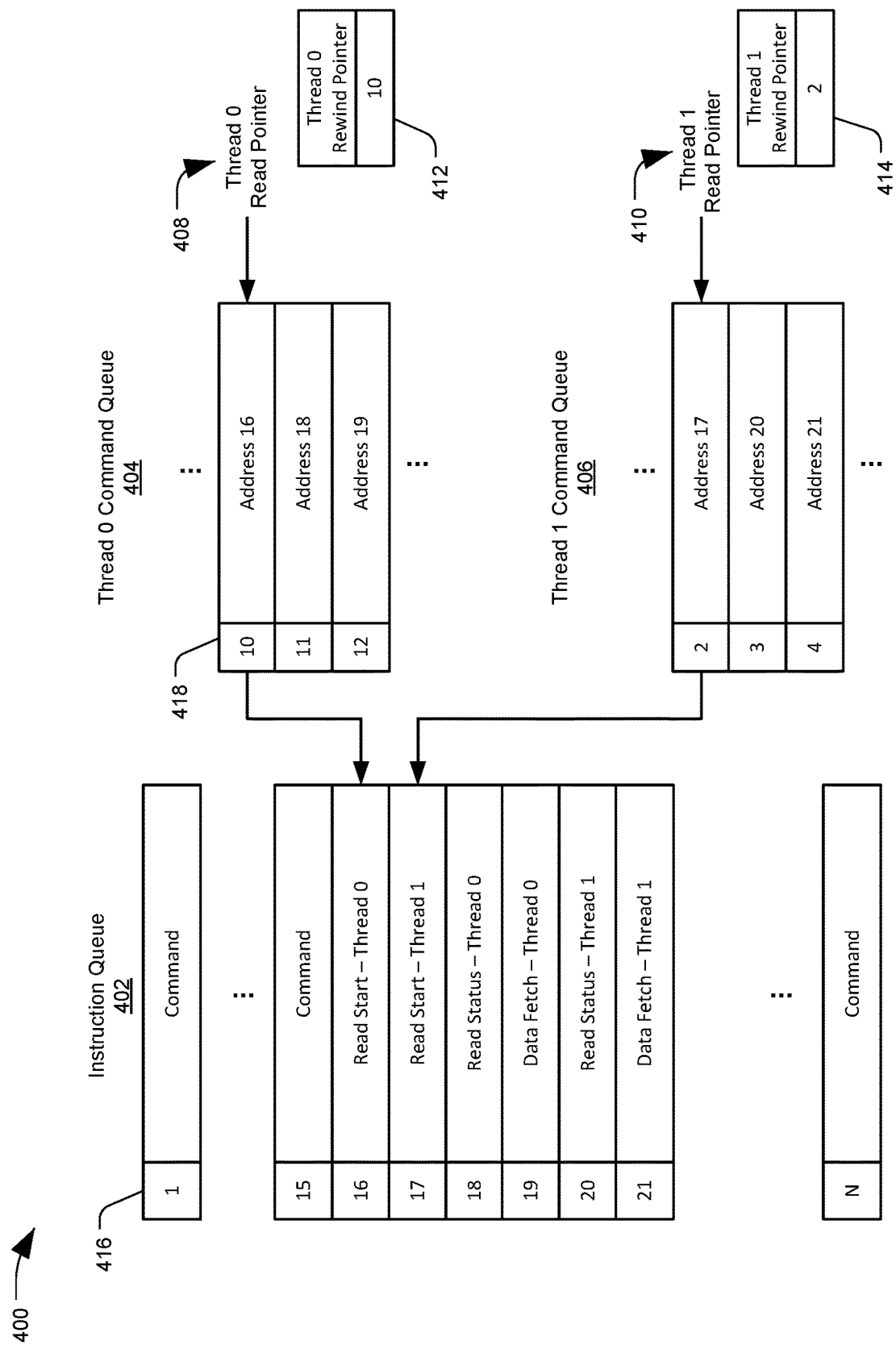
FIG. 4 is a diagram of a system configured to perform flash queue status polling, in accordance with certain embodiments of the present disclosure.

FIG. 4 is a diagram of a system 400 configured to perform flash queue status polling, in accordance with certain embodiments of the present disclosure. The system 400 may include an instruction queue 402, and a plurality of command queues, such as a thread 0 command queue 404 and a thread 1 command queue 406. As described above, the instruction queue 402 may store instructions sent from a data storage device controller to an AFQ. The instruction queue 402 may have a plurality of addresses or entries 416 where commands may be stored, depicted in FIG. 4 as addresses from 1 to N. Each instruction or command may have information identifying the type of instruction, and a thread identifier to identify a thread that the command has been assigned to. Each thread may also have a command queue, which may also include a plurality of addresses or entries 418. However, rather than storing a copy of the entire command data structure, the thread command queues may store pointers to commands in the main instruction queue 402.

When an instruction is received at the AFQ, it may be stored to the instruction queue in a selected slot. The thread identifier for the command may also be checked to determine the associated thread, and a pointer to the selected slot of the instruction queue 402 may be stored to a slot of the thread command queue. Each thread, e.g. via a thread state machine, may also maintain a read pointer used to progress through the thread command queue, such as thread 0 read pointer 408 and thread 1 read pointer 410. The read pointers may be used to advance through the thread command queue one entry at a time, for example progressing from a first entry 0 to a last entry N of thread 0 command queue 404.

In an example embodiment the controller may send a sequence of instructions to the AFQ. A host may have requested user data that is stored across two LUNs of a flash memory. The controller may split the host request into two read commands, one command to access the data from a first LUN, and a second command to access the requested data from a second LUN. The controller may assign the two commands to different threads, thread 0 and thread 1. Each command may comprise a sequence of instructions, including a read start instruction, a read status instruction, and a data fetch instruction. These are merely example instructions, and a different sequence may be used, such as the STATPOLL, chip enable, command instruction, address information, and READ data retrieval instructions of a previous example.

The controller may first issue the 'read start' for thread 0, which may be stored to instruction queue 402 at address 16. A thread decode module may determine that the instruction is for thread 0, and create a pointer to instruction queue address 16 in the Thread 0 command queue 404 at location 10. The "read start" command may be an indication to the AFQ that it is the start of a new command for which the rewind feature sure should enabled. Accordingly, a rewind pointer 412 may be generated for thread 0, pointing to the thread 0 command queue 404 location 10, which in turn points to the read start command in the main instruction queue 402.

The controller may then issue a read start instruction for thread 1, stored to address 17 of the instruction queue 402. A pointer to address 17 may be stored to the thread 1 command queue 406 at location or address 2, and a thread 1 rewind pointer 414 may be generated that points to address 2 of the thread 1 command queue 406.

The controller may then issue read status and data fetch instructions for thread 0, being stored to addresses 18 and 19 of the instruction queue 402, and with pointers to addresses 18 and 19 stored to thread 0 command queue 404 at locations 11 and 12, respectively. Therefore, even though the instructions to thread 0 are not contiguous in the instruction queue 402, the instructions for thread 0 can be executed in order by progressing the thread 0 read pointer 408 from thread 0 command queue 404 location 10, then 11, and then 12. Similarly, read status and data fetch commands for thread 1 may be stored to the instruction queue 402, with corresponding pointers stored to the thread 1 command queue 406.

In the example embodiment, thread 0 may use the thread 0 read pointer 408 to access thread 0 command queue at address 10. The pointer stored at address 10 allows the AFQ to access address 16 of the instruction queue and retrieve the "read start—thread 0" instruction. This may be the actual read instruction, or merely a marker to indicate the start of a rewind loop for thread 0 (e.g. a STATPOLL instruction). Thread 0 may then advance the thread 0 read pointer 408 to the next slot in the thread 0 command queue at location 11, and retrieve the "read status-thread 0" instruction from the instruction queue 402. If the status from the flash for the thread 0 read is not a "good" status, the AFQ may retrieve the thread 0 rewind pointer 412 and store the value to the thread 0 read pointer 408. In this manner, thread 0 has been "rewound" to location 10 in the thread 0 command queue 404, and the read start and read status instructions can be replayed. When a "good" status is returned, the thread 0 read pointer 408 may advance to location 12, and the pointer to the "data fetch-thread 0" instruction can be retrieved, triggering a HW engine to fetch the requested data. Further, the thread 0 rewind pointer 412 may be cleared or overwritten, and the locations in the instruction queue 402 reserved for the thread 0 read instructions (addresses 16, 18, and 19) can be returned to a free pool for available instruction queue 402 addresses for incoming instructions. Meanwhile, thread 1 may perform a similar sequence of operations for a different LUN. An example method of flash queue status polling is described in regard to FIG. 5

Figure 5:
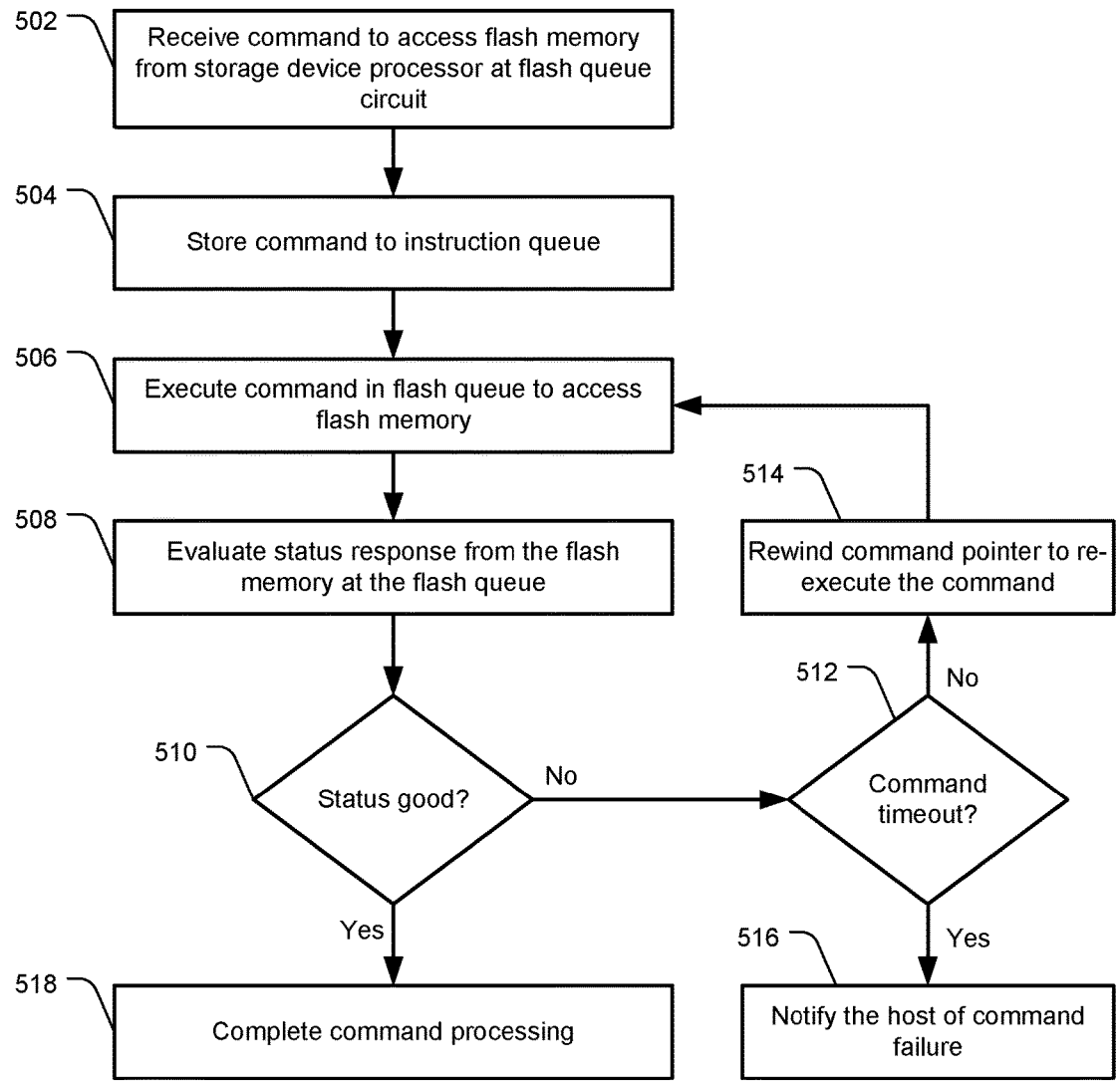
FIG. 5 is a flowchart of an example method of flash queue status polling, in accordance with certain embodiments of the present disclosure.

FIG. 5 is a flowchart of an example method 500 of flash queue status polling, in accordance with certain embodiments of the present disclosure. The method 500 may be performed by an advanced flash queue (AFQ) as described herein.

The method 500 may include receiving, from a data storage controller of data storage device (DSD) at a flash queue circuit of the DSD, a command to access a flash memory of the DSD, at 502. The command may include a single instruction, or a sequence of related instructions for completing a designated operation, such as a data read operation. At 504, the method 500 may include storing the command to an instruction queue for the flash queue circuit.

The method 500 may include executing the command at the flash queue circuit to access the flash memory, at 506. As used herein and elsewhere in this description, commands being "executed" at the flash queue circuit may be an abstraction of how actual instructions are performed. At a high level of abstraction, a controller or CPU of a DSD may execute instructions. That execution may involve sending commands to an AFQ, which may in turn "execute" commands by converting them to another protocol and sending them to a flash interface, and then they made be "executed" at the flash at the lowest level of abstraction. Each lower level may add details (e.g. instructions, parameters. timing controls, etc.) that the next level needs until ultimately the lowest level executes the operation that the highest level intended. Accordingly, "executing" commands at the AFQ may include executing local commands that do not leave the AFQ (e.g. STOP instructions), or passing those commands to a lower abstraction layer or another component of the DSD.

The flash queue circuit may evaluate a status response for the command from the flash memory, at 508. The method 500 may include determining, at the flash queue, whether the status was good, at 510. If not, the method 500 may include determining whether the command has timed out, at 512. When a command times out, it may mean that an amount of time allotted for the command to complete successfully has expired. If the command has not yet timed out, the method 500 may include rewinding a command pointer to re-execute the command, at 512. For example, a stored rewind pointer may be used to return to a previous selected instruction in an instruction queue, and re-execute a sequence of instructions from that point to see if a 'good' status can be obtained. Accordingly, re-executing a command may include only re-executing a subset of instructions associated with that command. In some embodiments, multiple commands may be related, and the rewind pointer may point to an instruction from an earlier command, thereby allowing the device to replay multiple previous commands if a current command fails. Re-executing one or more commands may be performed automatically by the flash queue circuit, without additional direction or instruction from the data storage controller to re-execute the command.

If the command has timed out, at 512, the method 500 may include notifying the host that the command has failed, at 516, such as by generating an interrupt from the AFQ to the FW notifying the FW to check the status queue for the command. After a command failure, the FW may opt to attempt the command again, potentially including adjusting parameters of the read on subsequent attempts, such as read voltages applied or other parameters.

If a good status is received, at 510, the method 500 may include completing the command processing, at 514. For example, a hardware engine may be triggered to retrieve the data from the flash memory during a read, and the requested data may be returned to a host device. The data storage controller may also be notified of a command status, either when the command completes successfully or if the command times out after continuing to received "bad" status responses. Another example method is presented in regard to FIG. 6

Figure 6:
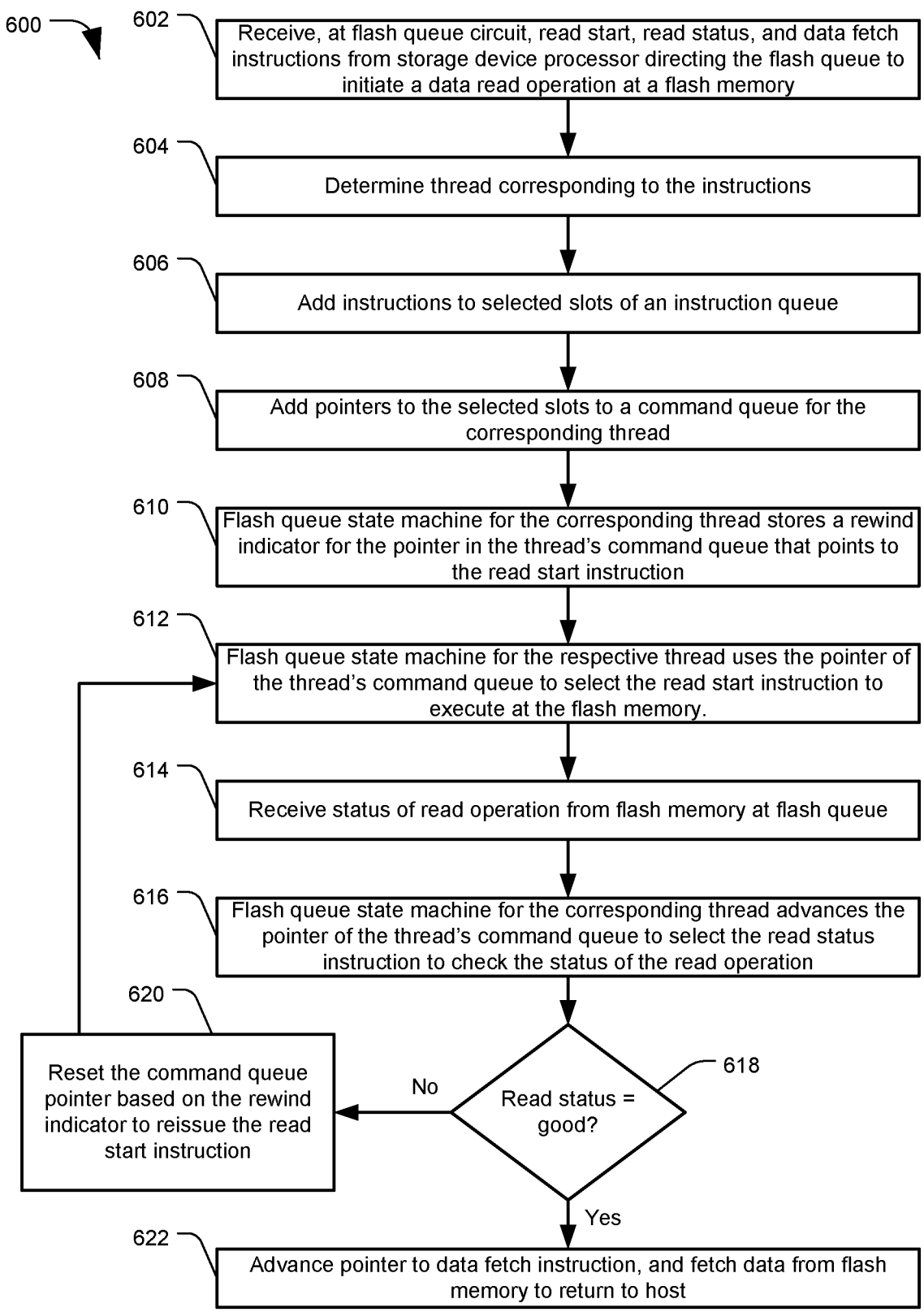
FIG. 6 is a flowchart of an example method of flash queue status polling, in accordance with certain embodiments of the present disclosure.

FIG. 6 is a flowchart of an example method 600 of flash queue status polling, in accordance with certain embodiments of the present disclosure. The method 600 may be performed by an advanced flash queue (AFQ) as described herein.

The method 600 may include receiving, at a flash queue of a data storage device (DSD), a read command comprising a sequence of instructions from a data storage controller or processor of the DSD, at 602. The instructions may include a read start, read status, and data fetch instructions directing the flash queue to initiate a data read operation at a flash memory of the DSD.

The method 600 may include determining a thread corresponding to the instructions, at 604. For example, each instruction may have a thread identifier (ID) field designating a selected or corresponding thread for the instruction. The instructions may be added to selected slots of an instruction queue of the flash queue, at 606, and pointers to the selected slots may be added to a command queue for the corresponding thread, at 608.

At 610, a flash queue state machine for the corresponding thread may store a rewind pointer or indicator identifying the pointer in the thread's command queue that points to the read start instruction. Instead of a read start instruction, there may be some other instruction configured to act as a marker to start a status polling loop, such as a STATPOLL command, with the rewind pointer set to identify the instruction that starts the loop.

The method 600 may include the flash queue state machine for the respective thread using a read pointer for the thread's command queue to select the read start instruction to execute at the flash memory, at 612. At 614, the flash queue may receive a status of the read operation from the flash memory, such as in the form of a bit sequence. The method 600 may include the flash queue state machine for the corresponding thread advancing the read pointer for thread's command queue to select the read status instruction, in order to evaluate the received status of the read operation, at 616. For example, the status bit sequence may be compared against one or more stored bit sequences identifying "good" or "bad" statuses. A determination may be made whether the read status was good, at 618. If not, the method 600 may include resetting the command queue pointer for the thread to a previous position based on the rewind indicator, in order to reissue the read start command, at 620. The read start instruction may then be re-executed, at 612.

When the returned read status is "good", at 618, the method 600 may include advancing the pointer for the thread's command queue to the data fetch instruction, and fetching the read data from the flash memory to return to the host, at 622.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, although the nonvolatile memory in the example embodiments is often referred to as "flash" memory, other types of nonvolatile memories may be substituted besides flash memory. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a flash queue circuit configured to:
      receive, from a data storage controller of a nonvolatile solid state memory (NVSSM) data storage device, one or more commands to access a flash memory of the NVSSM data storage device, each command of the one or more commands including one or more instructions;
      execute the one or more commands to access the flash memory;
      evaluate a status response from the flash memory at the flash queue circuit; and
      re-execute a sequence of instructions of the one or more commands based on the status response, the flash queue circuit configured to re-execute the sequence of instructions without receiving an indication to re-execute the sequence of instructions from the data storage controller of the NVSSM data storage device.

2. The apparatus of claim 1 comprising the flash queue circuit further configured to:
   generate a rewind pointer indicating a position in an instruction queue of a selected instruction of the one or more commands, the selected instruction corresponding to a start of the sequence of instructions; and
   determine, based on the rewind pointer, the sequence of instructions to re-execute when the status response indicates that a command from the one or more commands did not succeed.

3. The apparatus of claim 1 further comprising:
   a selected command of the one or more commands is directed to a read operation, and includes a read start instruction, a read status instruction, and a data fetch instruction;
   the flash queue circuit is further configured to:
      store the read start instruction, the read status instruction, and the data fetch instruction to selected slots of an instruction queue of the flash queue circuit;
      generate a rewind pointer indicating a position of the read start instruction in the instruction queue;
      execute the read start instruction to initiate the read operation at the flash memory;

execute the read status instruction to evaluate the status response;

use the rewind pointer to execute the read start instruction again if the status response indicates the read operation did not succeed; and execute the data fetch instruction to retrieve data requested in the read operation from the flash memory when the status response indicates the read operation did succeed.

4. The apparatus of claim 3 comprising the flash queue circuit configured to evaluate the status response further includes:

receive a bit sequence from the flash memory indicating the status response of the selected command;

compare the bit sequence against a stored bitmask value; and determine whether the read operation succeeded based on the comparison.

5. The apparatus of claim 3 comprising the flash queue circuit is further configured to:

execute a plurality of command threads, a command thread identifying an independently managed command processing instance that executes concurrently with other command threads; and execute one or more thread state machines, each thread state machine controlling an operational flow of one or more respective command threads from the plurality of command threads.

6. The apparatus of claim 5 further comprising the flash queue circuit is configured to execute a separate state machine for each command thread.

7. The apparatus of claim 5 comprising the flash queue circuit further configured to:

store instructions for the plurality of command threads to the instruction queue of the flash queue circuit;

store pointers to the selected slots of the instruction queue in a command queue of a first thread state machine associated with a first command thread for the selected command, to track instructions for the first command thread;

generate the rewind pointer to identify the pointer in the command queue that points to the read start instruction in the instruction queue;

advance through pointers in the command queue to execute operations for the first command thread; and return to an earlier point in the command queue and replay the sequence of instructions based on the rewind pointer.

8. The apparatus of claim 1 further comprising the NVSSM data storage device, including:

the data storage controller configured to receive the one or more commands from a host external from the NVSSM data storage device;

the flash queue circuit; and the flash memory.

9. The apparatus of claim 8, the NVSSM data storage device further including:

a hardware engine configured to load user data to the flash memory and retrieve user data from the flash memory; and a flash interface connected to the flash memory and via which the flash queue circuit and the hardware engine access the flash memory.

10. A method comprising:

receiving, at a flash queue circuit from a data storage controller of a nonvolatile solid state memory (NVSSM) data storage device, one or more commands to access a flash memory of the NVSSM data storage device, each command of the one or more commands including one or more instructions;

executing the one or more commands at the flash queue circuit to access the flash memory;

evaluating a status response from the flash memory at the flash queue circuit; and re-executing a sequence of instructions of the one or more commands based on the status response at the flash queue circuit without instruction from the data storage controller.

11. The method of claim 10 further comprising:

generating a rewind pointer indicating a position, in an instruction queue of the flash queue circuit, of a selected instruction of the one or more commands, the selected instruction corresponding to a start of the sequence of instructions; and determining, based on the rewind pointer, the sequence of instructions to re-execute when the status response indicates a command from the one or more commands did not succeed.

12. The method of claim 10, wherein evaluating the status response further includes:

receiving a bit sequence from the flash memory indicating the status response;

comparing the bit sequence against a stored bitmask value; and determining whether to re-execute the sequence of instructions based on the comparison.

13. The method of claim 10 further comprising:

receiving a selected command from the one or more commands, the selected command directed to a read operation, and including a read start instruction, a read status instruction, and a data fetch instruction;

storing the read start instruction, the read status instruction, and the data fetch instruction to selected slots of an instruction queue of the flash queue circuit;

generating a rewind pointer indicating a position of the read start instruction in the instruction queue;

executing the read start instruction to initiate the read operation at the flash memory;

executing the read status instruction to evaluate the status response;

executing the read start instruction again, based on the rewind pointer, when the status response indicates the read operation did not succeed; and executing the data fetch instruction to retrieve data requested in the read operation from the flash memory when the status response indicates the read operation did succeed.

14. The method of claim 13 further comprising:

executing a plurality of command threads, a command thread identifying an independently managed command processing instance that executes concurrently with other command threads; and one or more thread state machines, each thread state machine controlling an operational flow of one or more respective command threads from the plurality of command threads.

15. The method of claim 14 further comprising:

storing instructions for the plurality of command threads to the instruction queue of the flash queue circuit;

storing pointers to the selected slots of the instruction queue in a command queue of a first thread state machine associated with a first command thread for the selected command, to track instructions for the first command thread;

generating the rewind pointer to identify the pointer in the command queue that points to the read start instruction in the instruction queue;

advancing through pointers in the command queue to execute operations for the first command thread; and returning to an earlier point in the command queue and replay the sequence of instructions based on the rewind pointer.

16. The method of claim 10 further comprising re-executing the sequence of instructions without receiving an indication to re-execute the sequence of instructions from the data storage controller of the NVSSM data storage device.

17. An apparatus comprising:

a nonvolatile solid state memory (NVSSM) data storage device, including:

a data storage controller configured to receive commands from a host external from the NVSSM data storage device;

a flash memory;

a flash queue circuit configured to:

receive, from the data storage controller, one or more commands to access the flash memory, each command of the one or more commands including one or more instructions;

execute the one or more commands to access the flash memory;

evaluate a status response from the flash memory at the flash queue circuit; and re-execute a sequence of instructions of the one or more commands when the status response did not return a successful result, without receiving an indication to re-execute the sequence of instructions from the data storage controller.

18. The apparatus of claim 17 further comprising:

a selected command of the one or more commands is directed to a read operation, and includes a read start instruction, a read status instruction, and a data fetch instruction;

the flash queue circuit is further configured to:

store the read start instruction, the read status instruction, and the data fetch instruction to selected slots of an instruction queue of the flash queue circuit;

generate a rewind pointer indicating a position of the read start instruction in the instruction queue;

execute the read start instruction to initiate the read operation at the flash memory;

execute the read status instruction to evaluate the status response;

use the rewind pointer to execute the read start instruction again if the status response indicates the read operation did not succeed; and execute the data fetch instruction to retrieve data requested in the read operation from the flash memory when the status response indicates the read operation did succeed.

19. The apparatus of claim 18 comprising the flash queue circuit is further configured to:

execute a plurality of command threads, a command thread identifying an independently managed command processing instance that executes concurrently with other command threads;

execute one or more thread state machines, each thread state machine controlling an operational flow of one or more respective command threads from the plurality of command threads;

store instructions for the plurality of command threads to the instruction queue of the flash queue circuit;

store pointers to the selected slots of the instruction queue in a command queue of a first thread state machine associated with a first command thread for the selected command, to track instructions for the first command thread;

generate the rewind pointer to identify the pointer in the command queue that points to the read start instruction in the instruction queue;

advance through pointers in the command queue to execute operations for the first command thread; and return to an earlier point in the command queue and replay the sequence of instructions based on the rewind pointer.

* * * * *